(12) United States Patent
Bosma et al.

(10) Patent No.: US 6,925,170 B1
(45) Date of Patent: Aug. 2, 2005

(54) WIRE-BOUND TELECOMMUNICATION DEVICE AND A CIRCUIT FOR USE IN SUCH A DEVICE

(75) Inventors: Evert M. Bosma, Eindhoven (NL); Frank Van Dam, Adliswil (CH); Franciscus J. M. Thus, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/183,380

(22) Filed: Oct. 30, 1998

(30) Foreign Application Priority Data

Oct. 31, 1997  (EP) ............................................. 97203329

(51) Int. Cl.[7] ............................ H04M 1/00; H04M 3/00
(52) U.S. Cl. ................. 379/386; 379/380; 379/142.08; 379/215.01; 375/317; 375/334; 327/31; 327/100
(58) Field of Search ............................ 379/380, 142.08, 379/215.01, 386, 142.01, 142.04, 373.01, 373.02, 373.03, 90.01; 375/317, 334; 327/31, 100; 307/413

(56) References Cited

U.S. PATENT DOCUMENTS

| 4,270,208 | A | * | 5/1981 | MacDavid | .................. 375/317 |
| 4,309,664 | A | * | 1/1982 | Fellows | ........................ 327/29 |
| 5,237,589 | A | * | 8/1993 | Hayakawa et al. | ......... 375/287 |
| 5,428,662 | A | | 6/1995 | Hamilton | ...................... 379/24 |
| 5,519,774 | A | | 5/1996 | Battista et al. | .............. 379/386 |
| 5,550,908 | A | * | 8/1996 | Cai et al. | ............... 379/215.01 |
| 5,781,588 | A | * | 7/1998 | Abe et al. | .................... 375/334 |
| 5,864,607 | A | * | 1/1999 | Rosen et al. | ............. 379/90.01 |
| 5,901,219 | A | * | 5/1999 | Cason | ................... 379/373.01 |
| 6,058,171 | A | * | 5/2000 | Hoopes | ................. 379/142.01 |
| 6,122,353 | A | * | 9/2000 | Brady et al. | ........... 379/142.08 |
| 6,269,160 | B1 | * | 7/2001 | Bartkowiak | ................. 379/386 |

* cited by examiner

*Primary Examiner*—Xu Mei
*Assistant Examiner*—Ramnandan Singh
(74) *Attorney, Agent, or Firm*—Peter Zawilski

(57) ABSTRACT

In known telephone subscriber end stations a caller_ID IC detects a tone alerting signal TAS alerting that successive caller_ID information can be received for displaying on a display of the phone. The known station applies narrow frequency band filters to detect tones indicating the end of TAS. Such a detection is not flexible as it can only be used for a specific caller_ID signal protocol.

A flexible detector is proposed which can easily be adapted to widely varying protocols and which can also be used for other purposes such as the detection of power drops in an FSK signal. The detector comprises means for determining a time-domain signal representing the signal energy of a signal on the subscriber line in a predetermined time interval.

14 Claims, 3 Drawing Sheets

WIRE-BOUND TELECOMMUNICATION DEVICE AND A CIRCUIT FOR USE IN SUCH A DEVICE

BACKGROUND OF THE INVENTION

1. Field of the Invention

The present invention relates to a wire-bound telecommunication device comprising terminals for coupling the device to a subscriber line of a telecommunication network, a transmission circuit, and a signal energy detecting arrangement.

The present invention further relates to a circuit for use in a wire-bound telecommunication device.

2. Description of Related Art

A wire-bound telecommunication device of the above kind is known from the U.S. Pat. No. 5,519,774. In this US patent, the signal energy of an alerting signal is detected on the basis of a filtered signal. For filtering tone comprise in the alerting signal narrow frequency band filters are used. Such filters are complex and use a lot of chip area. Besides, no other use of the energy detector can be made because it can only measure the energy in a pre-filtered frequency band.

BRIEF SUMMARY OF THE INVENTION

It is an object of the present invention to provide a wire-bound telecommunication device comprising a signal energy detection arrangement which is simple and low cost in terms of chip area, and which can be used for other purposes than energy determination of tones.

To this end the wire-bound telecommunication device is characterised in that the signal energy detecting arrangement comprises means for determining a time-domain signal representing the signal energy of a signal on the subscriber line in a predetermined time interval. The present invention is based upon the insight that by not limiting the energy detection to small frequency bands of an input signal, the complete frequency spectrum can be monitored. Herewith, all kinds of signals can be detected and/or monitored. Preferably, the signal protocol should be known so that deterministic signal energy detection can be applied for predetermined signals in the signal protocol.

Embodiments of a wire-bound telecommunications device according to the present invention are claimed in the dependent claims. Signal energy can be determined cyclically or can be triggered by a trigger pulse generated at predetermined points of time. In one embodiment, the end of a tone alerting signal is detected and thereafter an FSK-detector (Frequency Shift Keying) for detecting a succeeding caller identification signal is initiated. At the same time, an AC-line impedance is switched parallel to the subscriber line. Because the signal energy detecting arrangement also 'sees' the FSK signal, power drops in such a signal can be easily detected. This is based upon the insight that the frequency spectrum of power drops is not confined to predetermined frequency bands and that thus filtering can not be applied for isolating power drops in the signal. If such a power drop lasts for too long a period, the wire-bound telecommunication device's idle state impedance is restored. In another embodiment, the signal energy detecting device can be used for monitoring subscriber line load variations. The signal energy determination according to the present invention is thus extremely simple and is flexible in use for detecting and monitoring all kinds of signals and for initiating control functions. Signal deviations are 'seen' without being limited in frequency. If the signal protocol is modified, e.g., by including an additional signal, the signal energy determination can easily be adapted so that also this additional signal is monitored.

BRIEF DESCRIPTION OF THE DRAWINGS

The present invention will now be described, by way of example, with reference to the accompanying drawings, wherein FIG. 1 schematically shows a wire-bound telecommunication device according to the present invention.

Throughout the figures the same reference numerals are used for the same features.

DETAILED DESCRIPTION OF THE INVENTIONS

Figure 1:
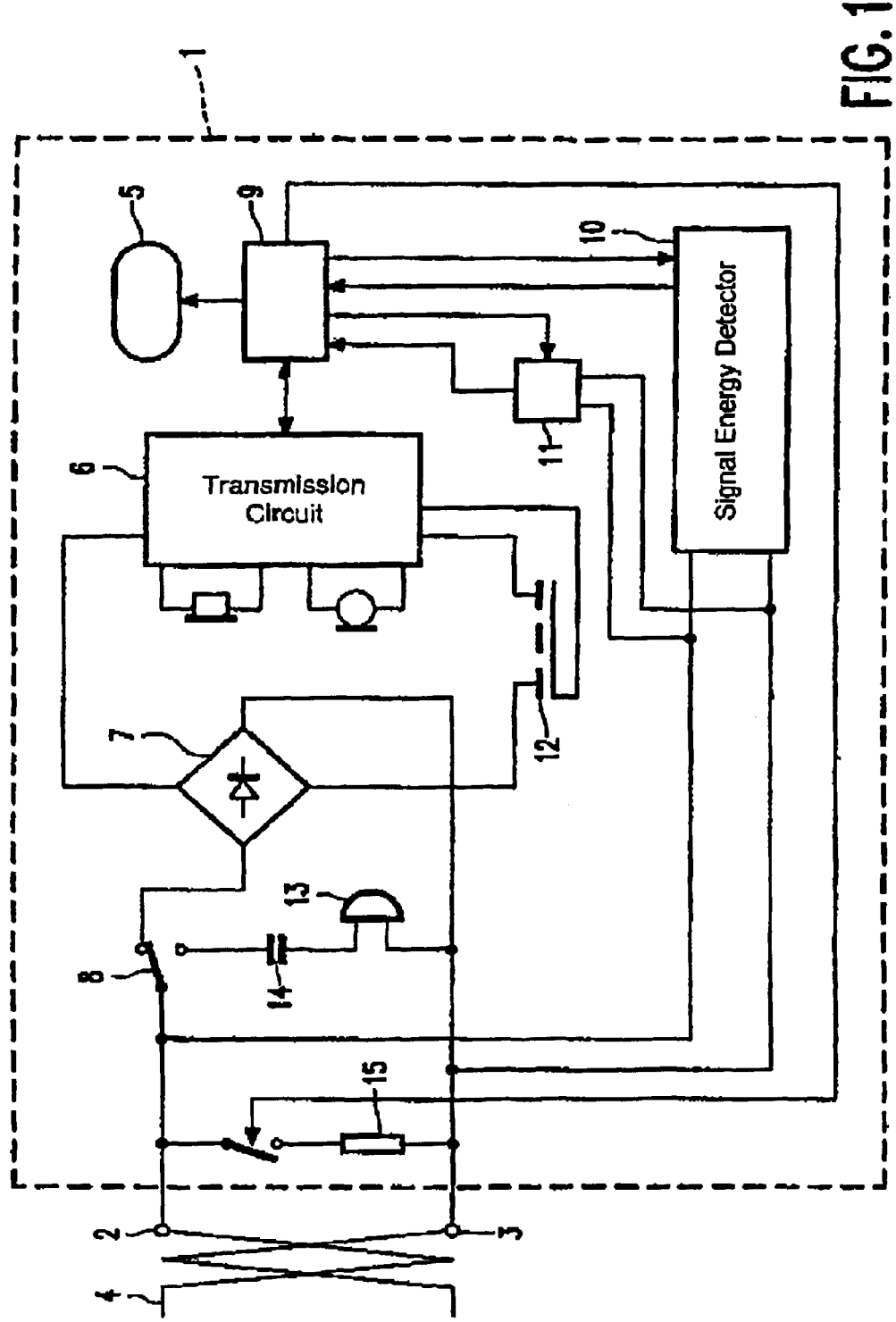

FIG. 1 schematically shows a wire-bound telecommunication device 1 according to the present invention. The device 1 comprises terminals 2 and 3 for coupling to a subscriber line 4 of a telecommunication network. Such a network can be an analog public switched telephone network, or any other suitable network, preferably offering a so-called caller identification service. With such a service, a subscriber gets information about the caller's IDentity such as the caller's telephone number and name. Upon reception of caller_ID information such information can be displayed on a display 5 comprised in the device 1. In a caller_ID signal protocol, first a so-called tone alerting signal TAS is received upon which the device 1 is prepared to receive the actual caller_ID information, e.g., in the form of FSK (Frequency Shift Keying) data (see FIG. 4). For starting the preparation phase, the end of the tone alerting signal TAS must be detected. In a British Telecom system, the end the TAS is signalled by two tones having the respective frequencies 2130 Hz±1.1% and 2750 Hz±1.1%. In a US Bellcore telecom system, the end of TAS tones are 2130 Hz ±0.5% and 2750 Hz±0.5%. It can thus readily been seen that a wire-bound telecommunication device designed for the US market applying narrow-band tone filtering as of U.S. Pat. No. 5,519,774 is not suitable for the British market. A costly re-design is needed because such a US-phone would simply not detect BT end of TAS tones. This is due to the fact that the tone tolerance in the BT system is greater than in the Bellcore system for which the narrow band filters were designed. The present invention does not show such a big disadvantage. The wire-bound telecommunication device 1 further comprises a transmission circuit 6 coupled to the terminals 2 and 3 via a rectifier bridge 7 and a cradle switch 8, a programmed microcontroller 9 comprising ROM and RAM memory, an energy detecting arrangement 10, and an FSK detector 11. The transmission circuit can be an IC type TEA106x or TEA111x, being readily available onto the market. The energy detecting arrangement 10 and the FSK detector 11 are coupled parallel to the subscriber line 4. Further shown is line-current interrupting transistor 12 for allowing pulse dialling. Instead of pulse dialling tone dialling can be applied. Then, via the transmission circuit 6 dialling tones are put on the subscriber line 4. For processing a caller's ringing signal on the subscriber line 4, the device 1 comprises a DC-decoupled bell 13. AC-coupling is achieved by a capacitor 14 in series with the bell 13. After reception of the caller_ID information, an AC line terminating impedance 15 is switched parallel to the line 4.

Figure 2:
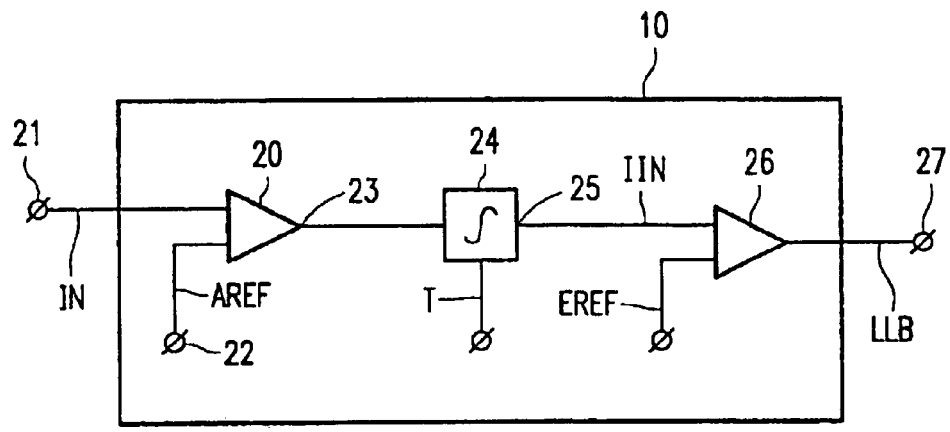
FIG. 2 shows a first embodiment of a signal energy detector according to the present invention.

FIG. 2 shows a first embodiment of the signal energy detector 10 according to the present invention. In this analog embodiment, the detector 10 comprises a comparator 20 for comparing a signal IN on the subscriber line at a terminal 21 with an amplitude reference signal AREF at a terminal 22. If the signal IN exceeds the reference signal AREF, at an output 23 of the comparator 20 a signal state transition occurs, practically resulting in a sequence of non-equidistant pulses of an unequal duration. These output pulses are fed to an integrator 24 which integrates the pulses over a predetermined interval T, e.g., 8 msec. Thereafter the integrator is reset and integration starts again. At an output 25 of the integrator 24 a time-domain signal IIN is thus available representing the signal energy of a signal on the subscriber line 4 in a predetermined interval T. The signal IIN is compared with an energy reference signal EREF by a comparator 26. At an output 27 of the signal energy detector 10 a control signal LLB, a low-level bit, is available. The low-level bit can be used to detect the end of TAS tones, to detect power drops in the FSK signal, to monitor subscriber line load variations, or for any other suitable use. In the sequel use of the low level bit LLB for end of TAS detection and FSK signal power drop detection will be described in more detail.

Figure 3:
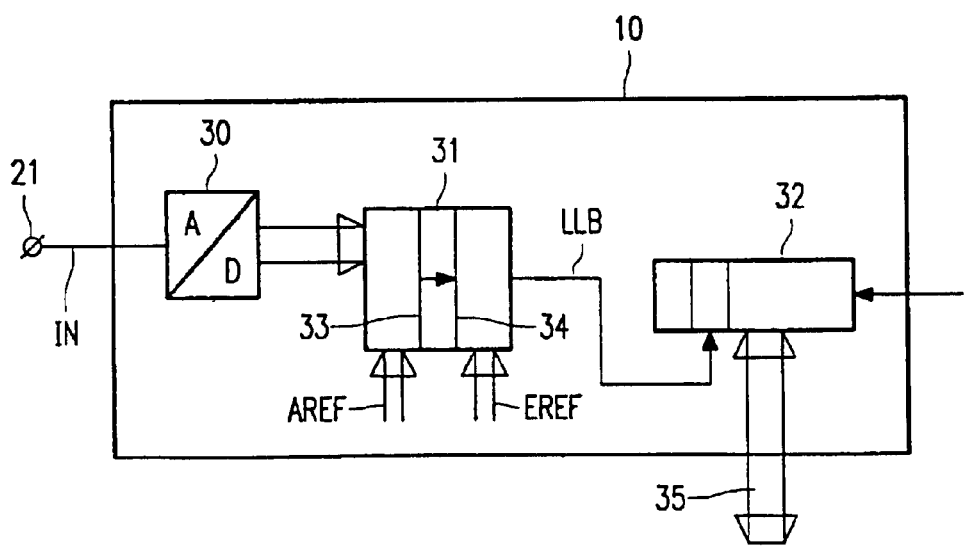
FIG. 3 shows a second embodiment of an signal energy detector according to the present invention.

FIG. 3 shows a second embodiment of the signal energy detector 10 according to the present invention. In this digital embodiment, the detector 10 comprises an analog-to-digital converter 30, a low-level bit comparator/counter 31, and caller_ID register 32. Basically, the same function is performed as in the analog embodiment of the detector 10. The comparator/counter 31 comprises a comparator 33 functioning as an amplitude detector and a counter 34 functioning as a presetable counter. The amplitude detector provides pulses as described in regard of FIG. 2 and the LLB, a counter overflow bit, indicates whether the average pulse energy and herewith the average of the signal 1N was above or below a given energy level. In the example given a bit value "0" represents a relatively high energy level and a bit value "1" represents a relatively low energy level. Herewith, because detecting is not limited to a narrow predetermined frequency band, arbitrary tones can be detected and also power drops in a signal. If the signal protocol changes, e.g., because an additional pulse is included, the microcontroller 9 can easily be reprogrammed to also detect such an additional tone. Further shown in FIG. 3 is a data 35 bus for coupling of the detector 10 to the microcontroller 9.

Figure 4:
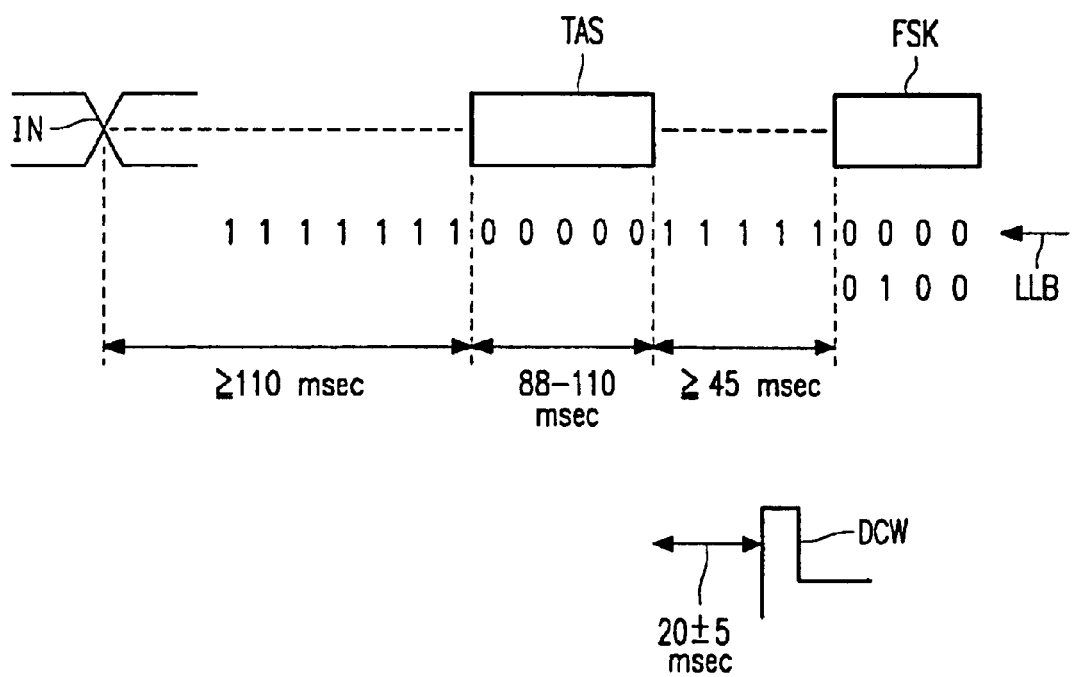
FIG. 4 shows signals in a wire-bound telecommunication device according to the present invention.

FIG. 4 shows the signals TAS and FSK in the input signal IN on the terminals 2 and 3 of the wire-bound telecommunication device 1 according to the present invention, and the low-level bit LLB at the output 27 or in the register 32 of the detector 10. Further shown is a so-called DC-wetting pulse DCW. The signals TAS and FSK are included in a caller_ID signal protocol which is assumed to be known at the programming stage of the wire-bound telecommunication device 1. For supporting several caller_ID protocols, a switch (not shown) could be provided at the bottom of the device 1. At different positions of the switch imprinted indications could be given to indicate predetermined protocols. The position of such a switch could be detected by the microcontroller 9 so as to distinguish detection protocols pre-loaded in the microcontroller 9. The subscriber could then simply adjust the device 1 to various protocols. Because the DC-wetting pulse DCW must be available at a given time after the signal TAS, e.g., after 20±5 msec, the end of TAS must be detected. In the example given, the TAS tone is applied to the line by the exchange in the network more than 110 msec after line reversal which is detected by the caller_ID IC (Integrated Circuit) switched parallel to the transmission IC 6. During the occurrence of the signal TAS, in a predetermined time interval, e.g., 8 msec, the energy on the subscriber line 4 is above the energy reference level EREF. The measurement can be done cyclically or can be triggered each time a trigger pulse is received from the microcontroller 9. Measurement can be stared after line reversal detection or upon detection of a ringing signal. For detecting a valid signal TAS, during a time interval having a length between 88 msec and 110 msec, the low-level bit LLB should remain "0". This time interval is fixed for a given signal protocol, e.g., the BT protocol. For this reason, energy detection can be applied for determining the presence of the signal TAS. Because the energy reference EREF is a number in a register it can easily be modified by the programmed microcontroller 9. After a valid TAS, the DC-wetting pulse DCW is generated, 20±5 msec after the end of TAS. FSK-data comprising the caller_ID information is put on the subscriber line more than 45 msec after the end of TAS. The DC-wetting pulse DCW is sent to the network for acknowledging the reception of a valid TAS and for preparing the device 1, notably the FSK detector 11, for the reception of data. In the example given such data are FSK caller_ID data. Advantageously, the detector 10 can also be used for detecting power drops in the signal FSK. If such a power drop would last too long, no correct reception of caller_ID information is achieved. In such a case, the idle state impedance is restored within 150 msec. Typically, a power drop lasting more than 40 msec is interpreted as receiving invalid caller_ID data. Power drop is detected by the microcontroller 9 by reading the low-level bit LLB while knowing that the signal FSK is present more than 45 msec after the end of TAS. Because of this a priori known signal timing, signals can be distinguished, in the given example the signals TAS and FSK. In FIG. 4, below the signal FSK, the low-level bit sequence "0000" indicates that there was no power drop and the low-level bit sequence "0100" indicates there actually was a power drop.

In view of the foregoing it will be evident to a person skilled in the art that various modifications may be made within the spirit and the scope of the present invention as hereinafter defined by the appended claims and that the present invention is thus not limited to the examples provided.

What is claimed is:

1. A wire-bound telecommunication device comprising:
   terminals for coupling the device to a subscriber line of a telecommunication network,
   a transmission circuit, and
   a signal energy detecting arrangement that is configured to determine a time domain signal representing signal energy of a substantial entirety of the signal on the subscriber line in a predetermined time interval,
   wherein the signal energy detecting arrangement comprises,
   a first comparator, the first comparator comparing the signal on the subscriber line with an amplitude reference signal, and generating a signal at a first comparator output;
   an integrator, the integrator integrating the signal at the first comparator output at the predetermined time interval and generating an integrated output; and a second comparator, the second comparator comparing the integrated output with an energy reference signal, and generating a control signal at a second comparator output;

wherein the telecommunication device operates according to a give signal protocol, the signal energy being determined during a least one predetermined expected signal interval; and wherein the signal protocol is a caller identification signal protocol and the expected signal interval comprises a tone alerting signal.

2. A wire-bound telecommunication device as claimed in claim 1, wherein the signal energy is determined cyclically.

3. A wire-bound telecommunication device as claimed in claim 1, wherein the signal energy determination is initiated by a trigger pulse.

4. A wire-bound telecommunication device as claimed in claim 1, wherein the signal energy determination is continued until a further expected signal interval comprising a caller identification signal.

5. A wire-bound telecommunication device as claimed in claim 4, wherein a caller identification signal detector is initiated by an initiating pulse which is generated a predetermined time after the detection of the tone alerting.

6. A wire-bound telecommunication device as claimed in claim 5, wherein the initiation pulse controls switching of an impedance parallel to the subscriber line.

7. A wire-bound telecommunication device as claimed in claim 1, wherein the energy determination is used for monitoring subscriber line load variations.

8. A wire-bound telecommunication device comprising:

terminals for coupling the device to a subscriber line of the telecommunication network, a transmission circuit, and a signal energy detecting arrangement that is configured to determine a time domain signal representing signal energy of substantial entirety of the signal on the subscriber line in a predetermined time interval, wherein the signal energy detecting arrangement comprises, an analog-to-digital converter, having an A/D output, and an A/D input coupled to the subscriber line of a telecommunications network, a comparator/counter, having an input coupled to the A/D output, the comparator/counter configured as an amplitude detector, the comparator/counter comparing the signal on the subscriber line with an amplitude reference signal and an energy reference signal at the predetermined time interval, generating data at a comparator/counter output; and a register, configured to store the data from the comparator/counter output, the register having an output databus;

wherein the telecommunication device operates according to a given signal protocol, the signal energy being determined during at least one predetermined expected signal interval; and wherein the signal protocol is a caller identification signal protocol and the expected signal interval comprises a tone alerting signal.

9. A wire-bound telecommunication device as claimed in claim 8, wherein the signal energy is determined cyclically.

10. A wire-bound telecommunication device as claimed in claim 8, wherein the signal energy determination is initiated by a trigger pulse.

11. A wire-bound telecommunication device as claimed in claim 8, wherein the signal energy determination is continued until a further expected signal interval comprising a caller identification signal.

12. A wire-bound telecommunication device as claimed in claim 11, wherein, a caller identification signal detector is initiated by an initiating pulse which is generated a predetermined time after the detection of the tone alerting.

13. A wire-bound telecommunication device as claimed in claim 12, wherein the initiation pulse controls switching of an impedance parallel to the subscriber line.

14. A wire-bound telecommunication device as claimed in claim 8, wherein the energy determination is used to monitoring subscriber line load variations.

* * * * *